(12) United States Patent  
Constable

(10) Patent No.: US 7,116,108 B2  
(45) Date of Patent: Oct. 3, 2006

(54) METHOD AND SYSTEM FOR SEAFLOOR GEOLOGICAL SURVEY USING VERTICAL ELECTRIC FIELD MEASUREMENT

(75) Inventor: Steven C. Constable, San Diego, CA (US)

(73) Assignee: The Regents of the University of California, San Diego, CA (US)

( * ) Notice: Subject to any disclaimer, the term of this patent is extended or adjusted under 35 U.S.C. 154(b) by 93 days.

(21) Appl. No.: 10/518,107

(22) PCT Filed: Jun. 11, 2003

(86) PCT No.: PCT/US03/18522

§ 371 (c)(1),  
(2), (4) Date: Dec. 10, 2004

(87) PCT Pub. No.: WO03/104844

PCT Pub. Date: Dec. 18, 2003

(65) Prior Publication Data

US 2005/0264294 A1    Dec. 1, 2005

Related U.S. Application Data

(60) Provisional application No. 60/387,784, filed on Jun. 11, 2002.

(51) Int. Cl.  
*G01V 3/00* (2006.01)

(52) U.S. Cl. .................. 324/350; 324/365; 324/348

(58) Field of Classification Search ............... 324/345, 324/365, 347–350; 702/5, 6, 11; 367/15–16  
See application file for complete search history.

(56) References Cited

U.S. PATENT DOCUMENTS 2,293,024 A    8/1942   Klipsch (Continued)

FOREIGN PATENT DOCUMENTS

WO        WO 01/20366 A1    3/2001

*Primary Examiner*—Jay M. Patidar  
(74) *Attorney, Agent, or Firm*—Eleanor M. Musick; Procopio Cory Hargreaves & Savitch LLP

(57) ABSTRACT

A system for mapping electrical conductivity of the seafloor incorporates a plurality of data logging units, where each unit (100) is an assembly adapted for deployment at a location on the seafloor for measurement of horizontal electric and magnetic fields. Rigidly attached and extending vertically from the unit assembly is a vertically-oriented substantially rigid arm (158) having a pair of vertically-displaced electrodes (160, 162) disposed on the arm to create a vertically-oriented dipole antenna. The electrodes are in electrical communication with an amplifier located within the assembly which generates an amplified signal which is then provided to a data logging processor also located within the assembly. The processor collects time series of amplified electric field and magnetic signals over a predetermined period of time.

20 Claims, 4 Drawing Sheets

U.S. PATENT DOCUMENTS

| | | |
|---|---|---|
| 2,531,088 A | 11/1950 | Thompson |
| 2,839,721 A | 6/1958 | Witte |
| 2,872,638 A | 2/1959 | Jones |
| 3,052,836 A | 9/1962 | Postma |
| 3,182,250 A | 5/1965 | Mayes |
| 4,047,098 A | 9/1977 | Duroux |
| 4,298,840 A | 11/1981 | Bischoff et al. |
| 4,617,518 A | 10/1986 | Srnka |
| 5,770,945 A | 6/1998 | Constable |
| 6,480,000 B1 | 11/2002 | Kong et al. |
| 6,603,313 B1 | 8/2003 | Srnka |
| 2003/0043692 A1 | 3/2003 | Ellingsrud et al. |
| 2003/0048105 A1 | 3/2003 | Ellingsrud et al. |
| 2003/0052685 A1 | 3/2003 | Ellingsrud et al. |

…

METHOD AND SYSTEM FOR SEAFLOOR GEOLOGICAL SURVEY USING VERTICAL ELECTRIC FIELD MEASUREMENT

RELATED APPLICATIONS

This application claims the priority of U.S. provisional application Ser. No. 60/387,784, filed Jun. 11, 2002. This application is related to U.S. application Ser. No. 08/670,939, now issued as U.S. Pat. No. 5,770,945. The disclosures of both applications are incorporated herein by reference in their entirety.

FIELD OF INVENTION

The present invention relates to measuring the electrical conductivity of the seafloor in a magnetotelluric or controlled source electromagnetic survey.

BACKGROUND OF THE INVENTION

The magnetotelluric (MT) method is an established technique which uses measurements of naturally occurring electromagnetic fields to determine the electrical resistivity, or conductivity, of subsurface rocks. An MT survey employs time series measurements of orthogonal components of the electric and magnetic fields, which define a surface impedance. This impedance, observed over a broad band of frequencies and over the surface, determines the electrical conductivity distribution beneath that surface, with horizontal layers of the earth being mathematically analogous to segments of a transmission line. Principal factors affecting the resistivity of subsurface materials include temperature, pressure, saturation with fluids, structure, texture, composition and electrochemical parameters. Resistivity information may be used to map major stratigraphic units, determine relative porosity or support a geological interpretation. A significant application of MT surveying is oil exploration. An MT survey may be performed in addition to seismic, gravity and magnetic data surveys. A combination of data from two or more different survey methods leads to a more complete understanding of subsurface structure than may be possible through the use of any single technique alone, particularly where the structure is such that measurement using a given technique may be contraindicated. For example, certain structures such as sediments buried under salt, basalt or carbonate have poor seismic performance and productivity. These structures generate strong reflections and reverberations, making imaging of the buried sediments difficult using acoustic methods alone. On the other hand, because the MT method does not involve the measurement of responses to artificially-created seismic events, it can be utilized in lieu of or in combination with seismic methods to minimize the error induced by reflections.

While the MT method has been used on land as an aid to petroleum exploration for many years, its application to marine continental shelf exploration is more recent. Remote reference data acquisition, robust data processing and multidimensional modeling and inversion have been required to produce meaningful responses to signals available from MT surveys.

Significant progress has been made in recent years in the ability to collect seafloor MT data. In the past, one primary reason for the limited use of MT for seafloor mapping was that high frequencies are rapidly attenuated by seawater, leading to a dramatic loss of electric and magnetic field power on the seafloor at periods shorter than 1000 seconds. However, to be useful for mapping continental shelf structures at depths relevant to petroleum exploration, MT measurements should be made at periods between 0.1 and 1000 seconds. The present inventor has addressed these difficulties by developing a system and method disclosed in U.S. Pat. No. 5,770,945, issued on Jun. 23, 1998, and entitled "Seafloor Magnetotelluric System and Method for Oil Exploration", which is commonly assigned with the present application and incorporated by reference herein. The system and method disclosed in that patent utilize horizontal electric and magnetic field measurements to map seafloor geological structures of interest in oil prospecting. An important improvement provided by the disclosed system and method is derived from the use of higher frequencies, on the order of 1 Hz, making it more appropriate for petroleum exploration compared with the systems in the prior art.

Measurement of horizontal fields alone provides only part of the information that is desirable for detailed mapping of geologic structures. While vertical electric fields do not exist at the surface on land, they are present in the ocean. Therefore, in order to fully exploit the MT technology for seafloor exploration, it would be advantageous to provide for measurement of vertical magnetotelluric impedances, which are preferentially sensitive to lateral variations in geological structure. Previous attempts to measure vertical e-fields have used noisy, tethered instruments, e.g., electrodes attached at intervals along a length of flexible cable which is dragged behind a vessel. For example, see U.S. Pat. No. 4,047,098 of Srnka or U.S. Pat. No. 2,839,721 of DeWitte. These prior art systems also used low frequency amplifiers such that they were subject to the above-described frequency limitations for application to seafloor oil exploration.

An additional use of the instrument described in U.S. Pat. No. 5,770,945 is for controlled source electromagnetic surveying, in which an electromagnetic (EM) transmitter is placed or towed in seawater, preferably at or near the seafloor. The amplitude and phase of the transmitted signals are then used to determine the electrical resistivity of subsurface rocks and fluids. Controlled EM source methods are well known in the art and have become almost routine for mapping of electrical conductivity of the seafloor in very shallow to deep ocean water, achieving seafloor penetration depths as great as 30 km in 5 km of water. However, these known methods have failed to recognize and/or take advantage of the vertical electric field and its ability to measure lateral variations in seafloor subsurface structure.

Accordingly, the need remains for a system and method which can exploit a vertical field's ability to measure lateral variations in the geological structure of the seafloor.

SUMMARY OF THE INVENTION

It is an object of the present invention to provide a seafloor magnetotelluric system and method which measures vertical magnetotelluric impedances.

It is a further object of the present invention to provide a method and system for seafloor subsurface mapping which is preferentially sensitive to lateral variations in geological structure.

It is also an object of the present invention to provide a method and system for seafloor subsurface mapping by measurement of vertical electric fields generated in response to an electromagnetic transmitter.

In an exemplary embodiment, a survey unit for use in a system of a plurality of survey units for geological survey comprises a structure comprising vertically displaced electrodes supported in a stable manner adjacent a seafloor location at which a seafloor data logger has been deployed. The structure is made from an insulated material and may be, in one form, rigidly mounted to a seafloor data logger. The electrodes are coupled to an amplifier, preferably a high gain, low input impedance, high frequency amplifier, which is connected to a data logging processor for recording the amplified signals. This combination of components is adapted to take measurements of the vertical component of an electric field generated by a controlled EM source or may use a transfer function between vertical electric fields and horizontal electric or magnetic fields to calculate a vertical magnetotelluric impedance. The values of the measured control signals, or the magnetotelluric impedance, can be used to infer seafloor geological structure.

In one aspect of the invention, a system for mapping electrical conductivity of the seafloor comprises a plurality of data logging units, each unit comprising an assembly adapted for deployment at a location on the seafloor for measurement of horizontal electric and magnetic fields. Rigidly attached to and extending vertically from the unit assembly is a vertically-oriented substantially rigid arm having a plurality of vertically-displaced electrodes disposed so that each of the electrodes is located above the unit's assembly. The electrodes are in electrical communication with an amplifier located within the assembly which generates an amplified signal which is then provided to a data logging processor also located within the assembly. The processor collects time series of amplified electric field and magnetic field signals over a pre-determined period of time, for example, several hundred seconds to several days. The detected electric fields may be naturally-occurring or artificially generated using a controlled electromagnetic (EM) source.

In one embodiment, a cable is attached to the assembly, preferably at an upper portions of the unit, with a second plurality of vertically-displaced electrodes attached thereto. At least one float is attached to the cable so that the second plurality of vertically-displaced electrodes floats in a generally vertical orientation at a higher level than the assembly. This second group of electrodes is in electrical communication with a second amplifier within the assembly for providing a signal to the data logging processor for data collection.

In another aspect of the invention, a method is provided for modeling seafloor conductivity, which method includes: deploying a plurality of units at different locations in an area of interest on the seafloor, wherein each unit comprises: an assembly adapted for measurement of horizontal electric fields and magnetic fields on the seafloor, the assembly including a frame; a vertical arm attached to and extending from the frame; a plurality of vertically-displaced electrodes disposed on the vertical arm to form a first vertical dipole, wherein each electrode is in electrical communication with an amplifier in the assembly; and wherein the vertical arm is substantially rigid so that the electrodes are disposed at fixed positions above the seafloor; sensing horizontal and vertical electric fields over a pre-selected spectrum; collecting data corresponding to the sensed electric fields from each of the plurality of units; and generating a model of resistivity using the collected data.

BRIEF DESCRIPTION OF THE DRAWINGS

The invention, both as to its organization and manner of operation may be further understood by reference to the following description taken in conjunction with the following drawings wherein.

DETAILED DESCRIPTION OF THE PREFERRED EMBODIMENTS

According to the present invention, a system for geological survey includes a plurality of surveying units deployed at different positions on the seafloor within an area of interest for mapping of the seafloor structure. Typically, the surveying units will be deployed from a ship adapted for efficient handling of the units, e.g., with a crane or extendable arm. Data accumulated in each of the units is collected for processing. Further description of the set-up of such a system is provided in U.S. Pat. No. 5,770,945 and will not be repeated here. The unit described herein, including all materials and any stated dimensions, corresponds to a test unit constructed by the inventor for experimental purposes and provides an example of how a surveying unit might be constructed. Accordingly, the following detailed description of the exemplary embodiment is not intended to be limiting.

Figure 1:
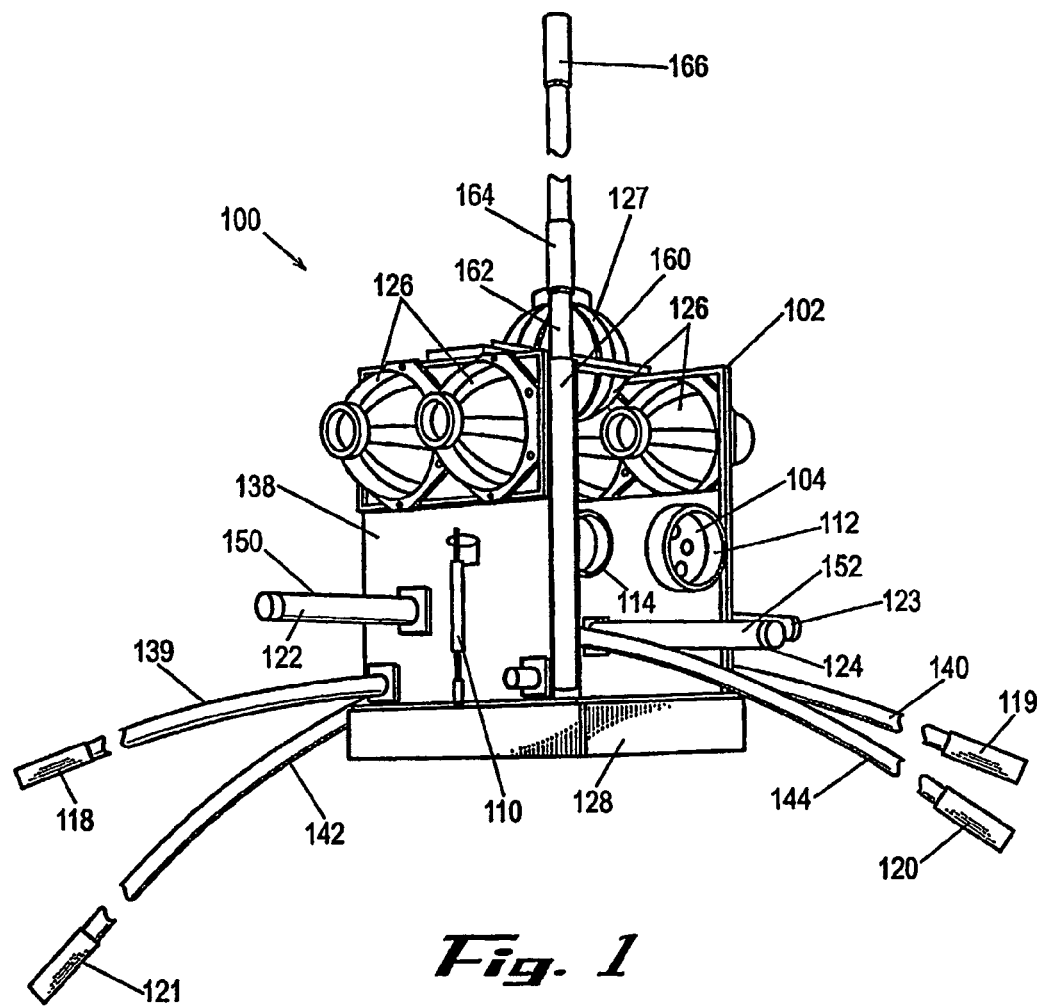
FIG. 1 is a diagrammatic perspective view of the surveying unit with horizontal and vertical electric field sensors and horizontal magnetic field sensors.
Figure 2:
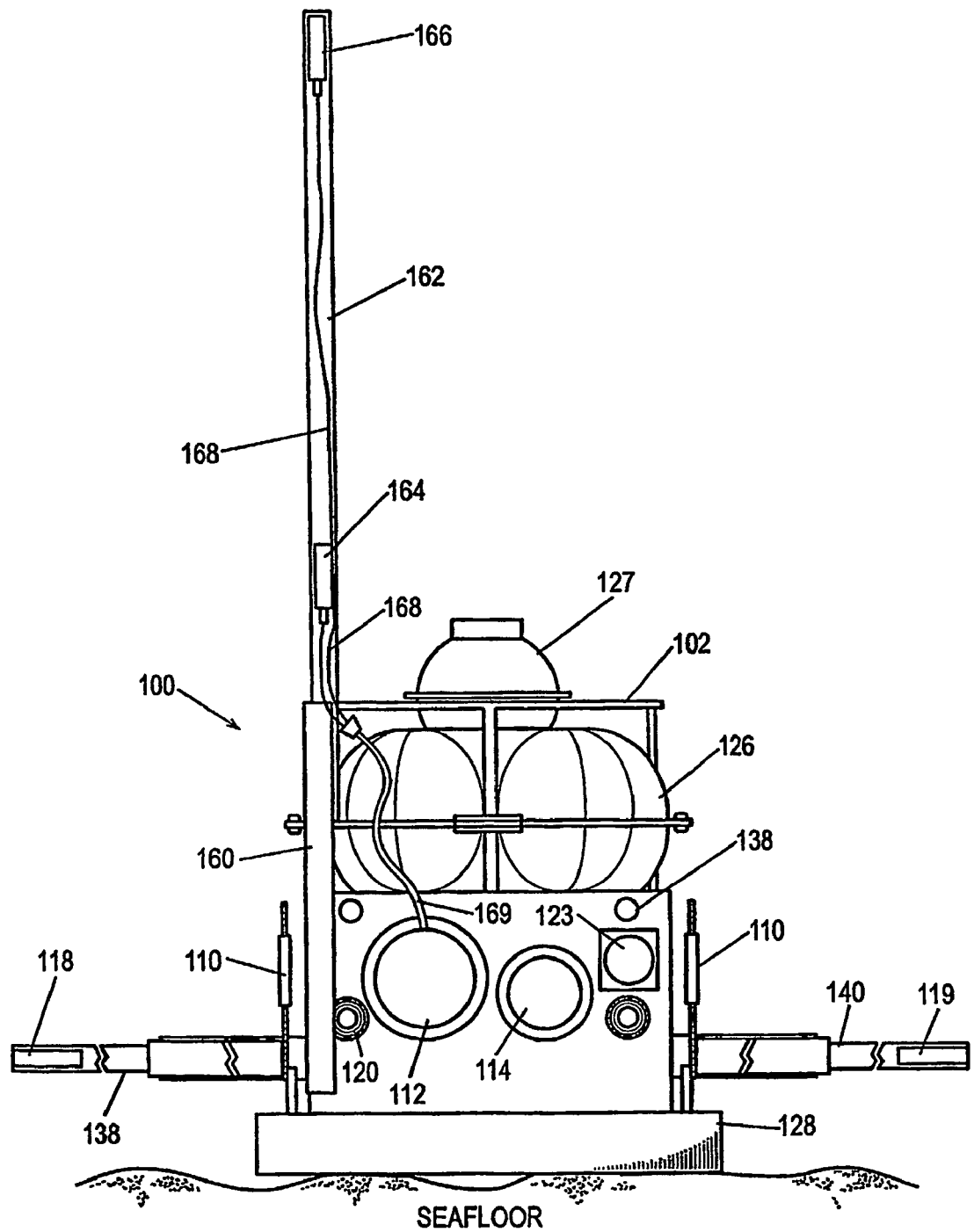
FIG. 2 is a side elevation of a system constructed in accordance with the present invention located on a seafloor.

FIGS. 1 and 2 illustrate an exemplary embodiment of the surveying unit 100 for deployment to the seafloor in the system and method of the present invention. In the exemplary embodiment, surveying unit 100 can generally be grouped into four main components. The first component, the logger unit, includes a multi-channel digital data logging processor, magnetic field post amplifier and electric field amplifiers, all contained within a first waterproof pressure case 112. The second component is a second waterproof pressure case 114 containing an acoustic navigation/release system 116. As will be apparent to those of skill in the art, the components of the logger unit and the navigation/release system can be combined into a single waterproof pressure case, or more than two waterproof enclosures can be used to house the electronic instruments. Accordingly, the division of components into two pressure cases as described herein is exemplary only and is not intended to be limiting.

The third component consists of four silver-silver chloride (Ag—AgCl) electrodes 118–121 mounted on the ends of 5 meter long booms 139–142 and two silver-silver chloride (Ag—AgCl) electrodes 160, 162 located at different positions along the length of vertical arm 158. The fourth unit includes magnetic induction coil sensors 122–124. All elements of the system are mounted on or attached to a corrosion-resistant plastic, e.g., polyethylene, and aluminum or stainless steel frame 138 along with glass spheres 126 for flotation and an anchor 128 for deployment to the seafloor. A lifting bail 102 is attached to the top of, or incorporated into, frame 138 for convenient handling during deployment and recovery.

Figure 3:
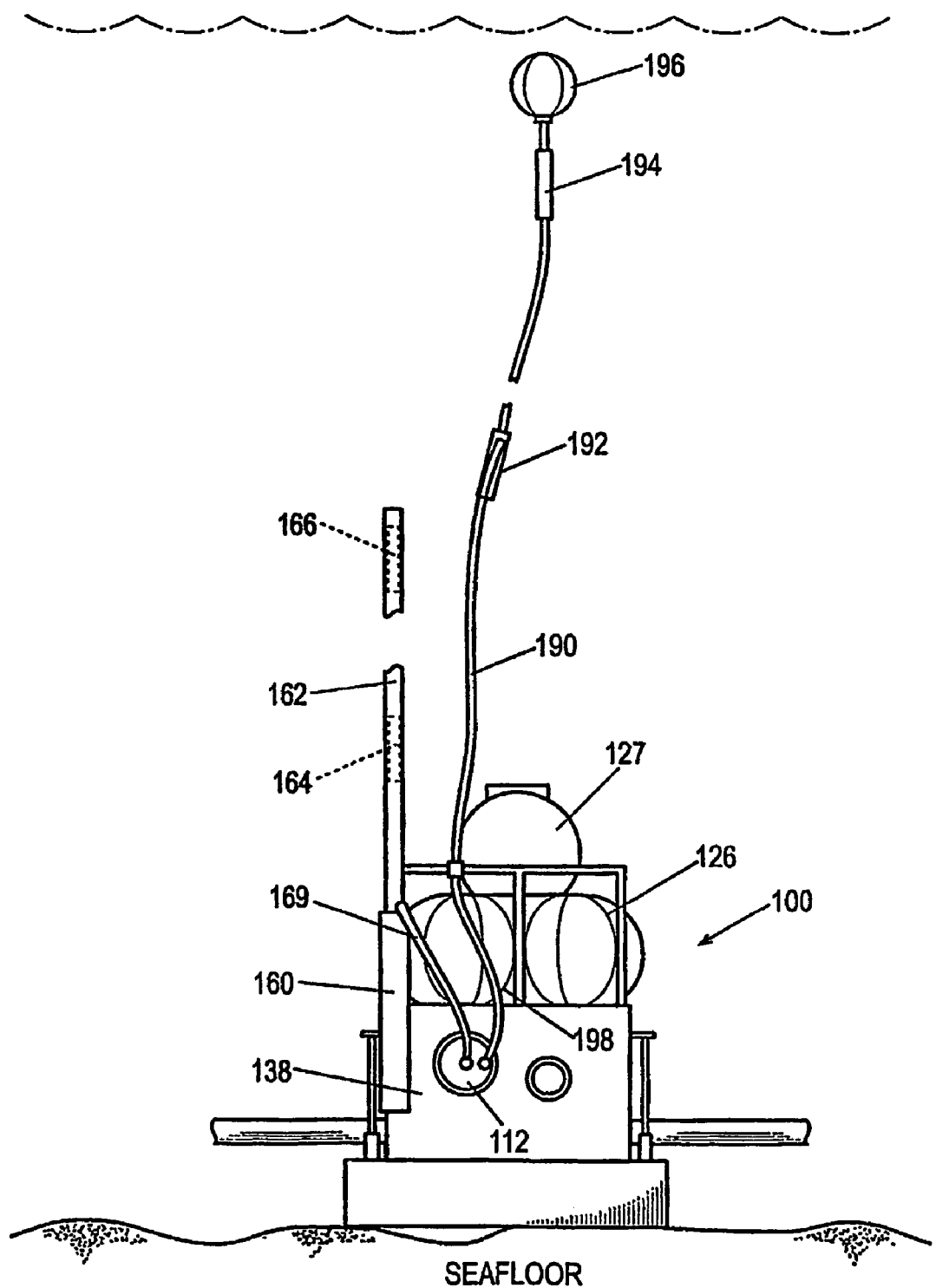
FIG. 3 is a diagrammatic view of a surveying unit for measurement of vertical electric field according to an alternate embodiment.

Referring to FIG. 3, in the exemplary embodiment, pressure case 112 comprises a 15 cm inside-diameter aluminum tube which is anodized and painted for corrosion resistance with end caps sealed with O-rings. Different dimensions and materials may be used, as will be apparent to those of skill in the art. One end cap of pressure case 112 includes high-pressure underwater connectors for connection to cables connected to the remote sensors 118–121, 164, 166. The entire system is capable of resisting water pressure to a depth of 6000 m (up to 8000 psi.) In the exemplary embodiment, four 13 inch flotation balls such as those available from Billings Industries or Benthos, Inc. (North Falmouth, Mass.) are attached to the unit. Alternatively, syntactic foam floats, such as those available from Cuming Corporation (Avondale, Mass.), or other composite foams may be used instead of glass. An additional float is attached to the upper portion of frame 138 and is provided as a stray line float 127. A recovery strobe light (not shown) and radio transmitter (not shown) may be housed within float 127 to facilitate location and recovery of the survey unit 100 at the ocean surface.

Pressure case 114 is constructed in a manner similar to that of case 112, with appropriate ports to allow connection to cables for electrical communication with other electrical components. Other types of pressure cases, including large capacity glass spheres, can also be used.

Pressure case 112 is supported in frame 138 to protect the instruments from damage during handling. Frame 138 also supports the floats 126, the pressure case 114 containing acoustic navigation/release system 116, the magnetometer coils 122–124, the electrode booms 139–142 and a concrete anchor which forms the bottom of the assembly.

Acoustic release system 116 provides means for releasing the unit 100 from the seafloor at the end of the recording period. In one embodiment, mechanical releases 110, 111 can be used to detach the anchor 128 from the rest of the unit, allowing the floats to lift the released components to the surface for recovery. A number of underwater acoustic release systems, such as those based on burn wire and other techniques, are commercially available and may be used for this purpose, including those manufacture by Benthos, Inc.

The horizontal electric field, or telluric, sensors are grounded dipole antennas. In the exemplary embodiment, booms 139–142 are 5 m lengths of semi-rigid plastic (e.g., PVC or polypropylene) pipe, with a diameter on the order of 2 inches. Preferably, the pipe is of sufficient diameter to permit the electrodes 118–121 to be placed inside so that they are protected during handling, e.g., deployment and recovery, of the unit. Insulated copper wires (not shown) are run through the pipes to connect the electrodes 118–121 to the amplifier. Alternatively, booms 139–142 may be formed from solid rods, such as fiberglass or other durable material, which have diameters on the order of 1 to 2 cm or more (0.05 to 1.0 inch or more). Selection of an appropriate diameter will depend on the type of material used. In this alternate embodiment, electrodes 118–121 will be retained on the outside of their respective booms, and the insulated wires for connection to the amplifiers will run along the outer surface of the rods, preferably anchored at points along the boom length using fasteners such as clamps or cable ties.

Two orthogonal 10 m dipoles are created by forming the booms in an "X"-configuration. The same effect can be achieved by using two 10 m booms, since the key is to provide a total boom length corresponding to the desired length of the dipole. Dipoles antennas of different lengths may be used as well, as will be apparent to those skilled in the art. The grounds at the dipole ends are provided by Ag—AgCl electrolyte-filled electrodes 118–121.

For detection of a vertical electric field, a vertical arm mount 160, which in the preferred embodiment is a cylindrical tube, is attached to frame 138 in a vertical orientation relative to the seafloor. Vertical arm 162 is inserted into mount 160 and fastened via appropriate fastening means so that it extends vertically above the frame 138 and the electrical components of the unit 100. Vertical arm 162 is a substantially rigid material in the form of a pipe or rod. To obtain the desired rigidity, arm 162 is preferably formed from polycarbonate resin, e.g., Lexan®, or a similar durable plastic. Other materials such as PVC (polyvinylchloride), polypropylene or the like may be used if reinforced or filled with a material for providing increased rigidity. First and second vertically displaced electrodes 164 and 166 are disposed at different points along the length of the vertical arm 162 to form a vertically-oriented dipole antenna. The electrodes 164 and 166 preferably comprise silver—silver chloride electrodes, i.e., the same electrodes as used for horizontal field measurement, and are connected respectively by insulated wires 168 (visible in FIG. 2) and cable 169 to a data logger 104 included within the electronics housing 112. In the preferred embodiment, both electrodes 164, 166 are retained within the interior of arm 162 with the lower electrode 164 positioned at a height above the main body of the unit 100 to minimize corruption from any deflected horizontal field(s) and to avoid distortion due to the proximity of metal and plastic parts in the main body of the survey unit 100. Electrode 166 is preferably disposed at or near the distal end of vertical arm 162.

In general, the greater the distance that the vertical field measuring electrodes can be located from noise sources such as the loggers and unit's frame, the better the signal-to-noise ratio. However, motion of the arm within the water is another source of noise. Therefore, vertical arm 162 should be of a length and rigidity selected to maximize the electrode distance from the unit assembly 100 without permitting excessive sway from currents and other motion within the seawater. Further, the length of vertical arm should not be so long so as to interfere with deployment of the unit. In the preferred embodiment, vertical arm 162 has a length on the order of 1 to 2 meters.

In an alternate embodiment illustrated diagrammatically in FIG. 3, additional vertical field measurement is provided by adding a flexible cable 190 with a second pair of vertically-displaced electrodes 192, 194 affixed thereto to unit 100. One or more floats 196 are attached to cable 190 so that the cable floats above the unit. As with the first vertical dipole, the lower electrode should be placed at a height above the frame to minimize noise from the rest of the assembly. Insulated wiring 198 for connection to an amplifier runs along, either externally or, preferably, internally, to cable 190 or a sleeve or covering surrounding the cable. This second pair of vertically-displaced electrodes 192, 194 serves as a second dipole antenna for vertical field measurement. Use of the cable permits a much longer dipole to be created, i.e., for the electrodes to be spaced much farther apart, relative to that available with the rigid arm. As previously stated, the longer the antenna, the better the signal-to-noise ratio (SNR), however, motion of the electrodes within the water will introduce additional noise. Therefore, a trade off must be made in selecting the length of the second vertical antenna array to optimize SNR. In an exemplary embodiment, cable 190 is of sufficient length that the dipole antenna formed by the second array is on the order of 10 meters. Cable lengths of 30 meters or more may also be used as long as the SNR is sufficient for the desired measurement.

A transfer function such as described by Hoversten, G. M., H. F. Morrison and S. Constable in an article entitled "Marine magnetotellurics for petroleum exploration, Part II: Numerical analysis of subsalt resolution", *Geophysics,* Vol. 63, No. 3 (1998), pp. 826–840, is used to generate a vertical magnetotelluric impedance value from the vertical electric field measurement. Those of skill in the art will recognize that other transfer functions may be used to achieve the goals of the invention. Generally, the transfer function is the ratio of the measured vertical electric field to the measured horizontal electric field or horizontal magnetic field, which has amplitude and phase components. The vertical electric field data can be combined with the horizontal electric and/or magnetic field data to yield a single MT value. This can be achieved by effectively expanding the size of the MT tensor, normally a 2×2 complex matrix relating the horizontal electric field to the horizontal magnetic fields, to a larger tensor which includes vertical components. On the other hand, the individual components of the tensor could be considered in an analysis. In the exemplary embodiment, interpretation of the results is performed using forward (one-, two- or three-dimensional) and/or inverse (one-, or two-dimensional) modeling using a commercially-available software package for interpretation of MT data. Examples of such software packages are the Geotools® MT software available from Geotools Corporation of Austin, Tex., and the EMIX MT software available from Interprex, Inc. of Golden, Colo.

Referring again to FIG. 1, the magnetic field sensors 122,124 (magnetometers) are multi-turn Mu-metal core coils similar to those that are commonly used for land MT surveys. In the preferred embodiment, the coils are formed using aluminum wire for reduced weight, however, other conductive wires appropriate for construction of coils, e.g. copper, may also be used. The magnetotelluric source field is measured over a broad frequency spectrum, preferably between 0.001 Hz up to 10 Hz. Each of the magnetic sensors 122,124 is encased in an aluminum pressure case 150,152 which is roughly 6 cm in diameter and 1.3 meters long, with the pressure cases 150,152 arranged orthogonally on frame 138. Using two magnetic field coils, gains in weight, buoyancy and stability of the system can be recorded. If three coils are used, arranged orthogonally to measure $H_x$, $H_y$, $H_z$, the full three-dimensional magnetic vector can be recorded.

The output signal from each of the magnetometers 122, 124 is input into a chopper amplifier 106 (shown in FIG. 4) with a similar construction to that of the electric field amplifiers described in U.S. Pat. No. 5,770,945. The gain provided by amplifier 106 is about $10^5$.

Figure 4:
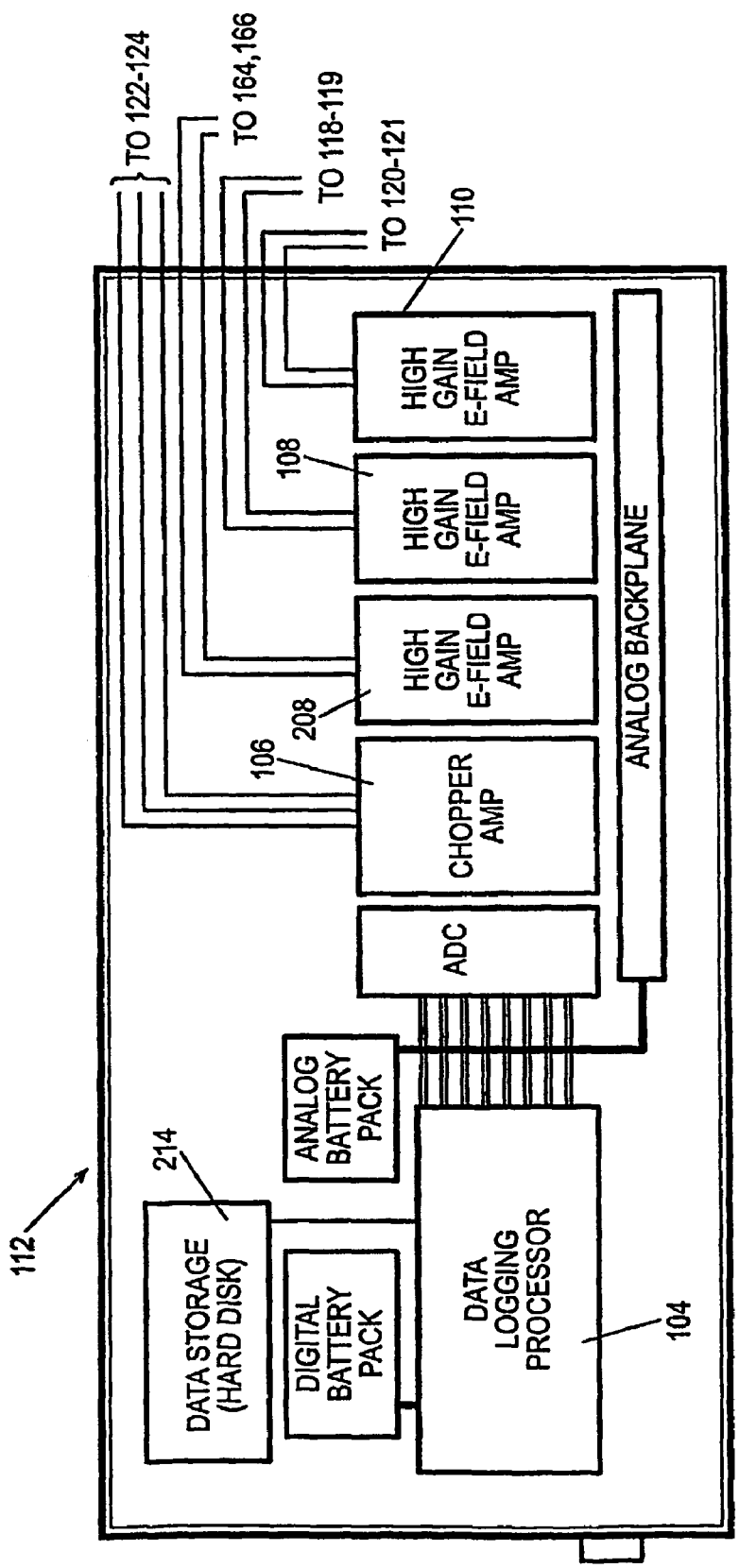
FIG. 4 is a block diagram of an exemplary embodiment of the logger unit of the present invention.

The data logging processor 104 may be a combination separate components such as a CPU and memory with appropriate interfaces or may be a commercially-available data logger adapted for use with geophysical instruments. Criteria for selection of an appropriate data logging processor are known to those of skill in the art. As shown in FIG. 4, data logging processor 104, which is retained within pressure case 112, is configured for six component operation. Data storage is provided via a hard disk drive 214, as shown, or other large capacity storage device such as a RAM device. Horizontal dipole antennas for measurement of electric fields in the ocean are formed by AC coupling electrodes 118–119 and 120–121 across inputs to high gain amplifiers 108 and 110, respectively. The signals generated by magnetometer coils 112–124 are fed into amplifier 106 for amplification. The vertical dipole antenna is formed by AC coupling electrodes 164 and 166 across inputs to amplifier 208, which is the same type of amplifier as amplifiers 108, 110. In addition to measuring DC potential, these antennae measure vertical fields arising from electromagnetic induction created by the earth's magnetic field. Variations in the field are due to lateral contrasts in layers of the subsea structure.

Amplifiers 108, 110 and 208, which are designed for very low noise (<0.13 $nV/Hz^{1/2}$) and high gain ($10^4$ to $10^6$) operation, generate outputs corresponding to their respective E-fields to data logging processor 104. Further details for the high gain amplifier are provided in U.S. Pat. No. 5,770,945 and are not repeated herein.

In addition to MT measurement, surveying unit 100 can be used to measure artificially generated signals such as those provided from a deep towed instrument, i.e., a "controlled EM source", which transmits controlled electromagnetic signals. An example of a suitable EM transmitter is a 100 to 500 meter horizontal electric dipole towed in close proximity (10–100 meters) to the seafloor and injecting $10^2$ to $10^3$ amps into the seawater. Such a transmitter is described by Constable, S. and Cox, C. S. in "Marine controlled source electromagnetic sounding 2. the PEGASUS Experiment", *J. Geophys. Res.* 101 (1996) pp. 5519–5530. The transmitter is towed at distances of 10 m to 10 km from the electric field loggers. A potential across the electrodes 164 and 166 is sensed over a frequency spectrum appropriate to the transmitted signals. This spectrum is preferably 0.1 to 100 Hz at a number of discrete frequencies. The amplitude and phase of the controlled source transmissions as a function of range and frequency are used to infer sea floor geological structure. The controlled EM source measurements may be made in the time domain instead of the frequency domain, whereby a discrete frequency is replaced by a rapid turn-on or turn-off of the transmitted signal.

Magnetotellurics is better at resolving conductive features than are controlled EM source techniques. On the other hand, controlled EM source surveying is better at resolving resistive features. Therefore, it may be desirable to combine the two techniques to obtain increased resolution, particularly in areas of shallow resistive rocks such as basalt.

According to the method of the present invention, the survey units 100 are deployed at different positions on the seafloor within an area of interest for modeling of the seafloor structure. Typically, the surveying units will be deployed from a ship adapted for efficient handling of the units, e.g., with a crane or extendable arm. Exemplary spacing between the survey units is on the order of tens of meters to a few kilometers, with anywhere from 15 to 100 units being deployed. After a pre-determined period of time, which may be on the order or several hours to several days, the anchor releases on each of the survey units will be triggered by an acoustic signal from the ship, causing the survey unit to rise to the surface for recovery. The period of time over which data is collected will depend upon the data collection rate and the data storage capacity of the data processing unit. Data accumulated by each of the units is collected and transferred to a processing system for analysis and data output. In the preferred embodiment, interpretation of the data is performed to generate one or more models of resistivity, or apparent resistivity, of the structure across the area of interest.

It will be evident that there are additional embodiments which are not illustrated above but which are clearly within the scope and spirit of the present invention. The above description and drawings are therefore intended to be exemplary only and the scope of the invention is to be limited solely by the appended claims.

What is claimed is:

1. A system for modeling seafloor conductivity, the system comprising a plurality of units deployed at different locations on the seafloor, each unit comprising:
   an assembly, including a frame for supporting a plurality of electrodes, the assembly configured for resting on the seafloor;
   a first pair of electrodes, mounted in relation to the frame in vertical displacement from one another, to form a dipole, wherein each electrode of the dipole is in electrical communication with an output providing a signal that is induced by vertical electric fields present near the seafloor.

2. The system of claim 1, wherein a lower electrode of the pair of electrodes is mounted so that it is positioned above the frame.

3. The system of claim 1, wherein the pair of electrodes are disposed on a substantially rigid arm attached to the frame.

4. The system of claim 3, wherein the arm has a length in the range of 1 to 2 meters.

5. The system of claim 1, further comprising a second pair of electrodes, mounted in relation to the frame in vertical displacement from one another, to form a second dipole, wherein each electrode of the second dipole is in electrical communication with a second output providing a signal that is induced by vertical electric fields present near the seafloor.

6. The system of claim 5, further comprising a cable coupled to the frame, wherein the second dipole is mounted to the cable and the displacement between the electrodes in the second pair is substantially greater than the displacement between the electrodes in the first pair.

7. The system of claim 1, wherein the electrodes are mounted on a cable attached to the frame and further comprising a float disposed at a distal end of the cable.

8. The system of claim 1 further comprising: at least two magnetic field induction sensors disposed horizontally on the frame orthogonal relative to each other.

9. A system for modeling electrical conductivity of the seafloor, the system comprising a plurality of units deployed on the seafloor, each unit comprising:
   a frame adapted for deployment to the seafloor;
   a pair of horizontal dipoles extending from the frame in an orthogonal orientation relative to each other for generating a pair of first electric field signals;
   a pair of electrodes extending vertically from the frame and vertically displaced relative to each other to form a vertical dipole for generating a second electric field signal;
   at least one first amplifier in electrical communication with the horizontal and vertical dipoles for amplifying each of the first and second electric field signals, the first amplifier having a low input impedance and high gain;
   a data logging processor in electrical communication with each of the first amplifier for receiving amplified electric field signals and storing data representative thereof
   a clocking device for synchronizing operation of the data logging processor with other data logging processors on other units within the system;
   a power supply in electrical communication with the data logging processor, the clocking device and the first and second amplifiers;
   at least one housing for enclosing the data logging processor, the clocking device, the first amplifier and the power supply, the at least one housing adapted for corrosion and pressure resistance in seawater;
   means for deploying the unit to the seafloor; and
   means for retrieving the unit from the seafloor.

10. The system of claim 9, wherein a lower electrode of the pair of electrodes is positioned at a height above the frame.

11. The system of claim 9, wherein the pair of electrodes is disposed on a substantially rigid arm attached to the frame.

12. The system of claim 11, wherein the substantially rigid arm has a length in the range of 1 to 2 meters.

13. The system of claim 11, further comprising:
   a cable attached to and extending from the frame;
   a float disposed at a distal end of the cable; and
   a second vertical dipole comprising a second pair of vertically-displaced electrodes disposed on the cable for generating a third electric field signal, wherein the second vertical dipole is substantially longer than the first vertical dipole, and wherein the second vertical dipole is in electrical communication with the at least one first amplifier.

14. The system of claim 9, wherein the pair of electrodes is disposed on a cable and further comprising a float disposed at a distal end of the cable.

15. The system of claim 9 further comprising:
   at least two magnetic field induction sensors disposed horizontally on the frame orthogonal relative to each other;
   a second amplifier disposed within the at least one housing in electrical communication with the induction sensors for amplifying a magnetic field signal generated by each induction sensor; and
   wherein the second amplifier is connected to the power supply and provides an amplified magnetic field signal to the data logging processor.

16. A method for modeling seafloor conductivity, comprising:
   deploying a plurality of units at different locations in an area of interest on the seafloor, wherein each unit includes:
   an assembly including a frame for supporting a plurality of electrodes, the assembly configured for resting on the seafloor;
   a first pair of electrodes, mounted in relation to the frame in vertical displacement from one another, to form a first vertical dipole, wherein each electrode of the dipole is in electrical communication with an output providing a signal that is induced by vertical electric fields present near the seafloor;
   using the units, sensing horizontal and vertical electric fields over a pre-selected spectrum;
   collecting data corresponding to the sensed electric fields from each of the plurality of units; and
   generating a model of resistivity using the collected data.

17. The method of claim 16, wherein each unit includes a second pair of electrodes, mounted on a cable attached to the frame, in vertical displacement from one another by an amount greater than the vertical displacement between the first pair of electrodes and forming a second vertical dipole.

18. The method of claim 16, further comprising:

towing an EM transmitter close to the seafloor within the area of interest;

wherein the step of sensing comprises detecting electric fields generated by the EM transmitter.

19. The method of claim 16, wherein the assembly is further adapted for measurement of magnetic fields.

20. A method of exploring seafloor conductivity, comprising:

using, at a plurality of locations, a plurality of vertically spaced electrodes, to provide a signal induced by vertically oriented fields at each location; and obtaining a measurement at each of the locations associated with the signal thereat.

* * * * *